United States Patent [19]

Puryear

[11] 4,448,367
[45] May 15, 1984

[54] SPIN CASTING TYPE REEL WITH DRAG REDUCING FRONT COVER

[75] Inventor: John W. Puryear, Tulsa, Okla.

[73] Assignee: Brunswick Corporation, Skokie, Ill.

[21] Appl. No.: 380,233

[22] Filed: May 20, 1982

[51] Int. Cl.³ .............................................. A01K 89/01
[52] U.S. Cl. .............................................. 242/84.2 A
[58] Field of Search .................. 242/84.21 A, 84.2 A, 242/84.21 R, 84.2 R

[56] References Cited

U.S. PATENT DOCUMENTS

| | | | |
|---|---|---|---|
| 3,038,682 | 6/1962 | Yeada | 242/84.2 A |
| 3,044,730 | 7/1962 | Yeada | 242/84.2 A |
| 3,223,346 | 12/1965 | Fowler | 242/84.2 A |
| 3,329,372 | 7/1967 | Willis et al. | 242/84.2 A |
| 3,554,459 | 1/1971 | Matsui . | |

OTHER PUBLICATIONS

Zebco 1976 Catalog: "New Zebco 33XBL", p. 1.

Primary Examiner—Stuart S. Levy
Assistant Examiner—Thomas R. Hannon
Attorney, Agent, or Firm—John G. Heimovics

[57] ABSTRACT

In a spinning-style fishing reel, a front cover for the reel includes a conical portion having a line guide and an inner bearing or contact surface. The inner contact surface in turn includes a series of raised portions or ribs separated by recessed channels, with the ribs and channels extending between inner and outer peripheral boundaries and encircling a collar surface adjacent the line guide. As a fishing line is cast from the reel, the fishing line contacts substantially only the raised portions or ribs which are disposed transversely to the outgoing fishing line. The line contact with only the facing edges of the ribs prevents grabbing and adhering of the line with the inside front cover permitting better and longer casts. Water and debris which may be carried by the fishing line may be scraped off the line by the ribs and collect in the recessed channels away from the line, likewise reducing drag on the outgoing fishing line and improving casting efficiency. The ribs and channels may assume a fan-like appearance, and may be manufactured simultaneously with the front cover, resulting in an inexpensive and reliable apparatus for reducing drag during casting of the fishing line.

14 Claims, 8 Drawing Figures

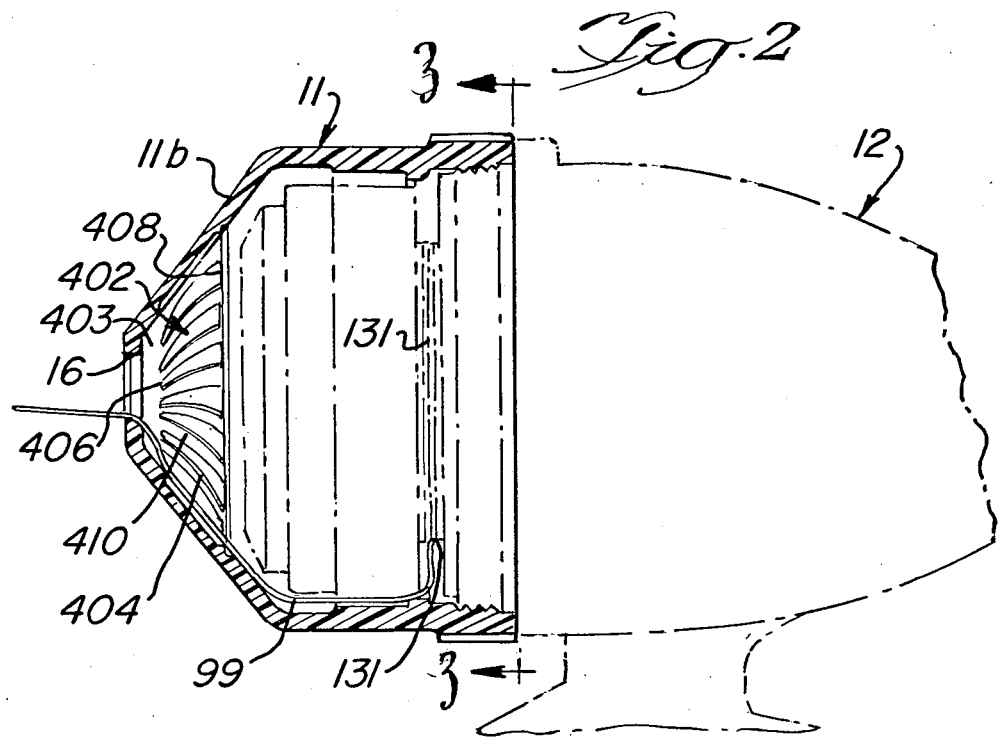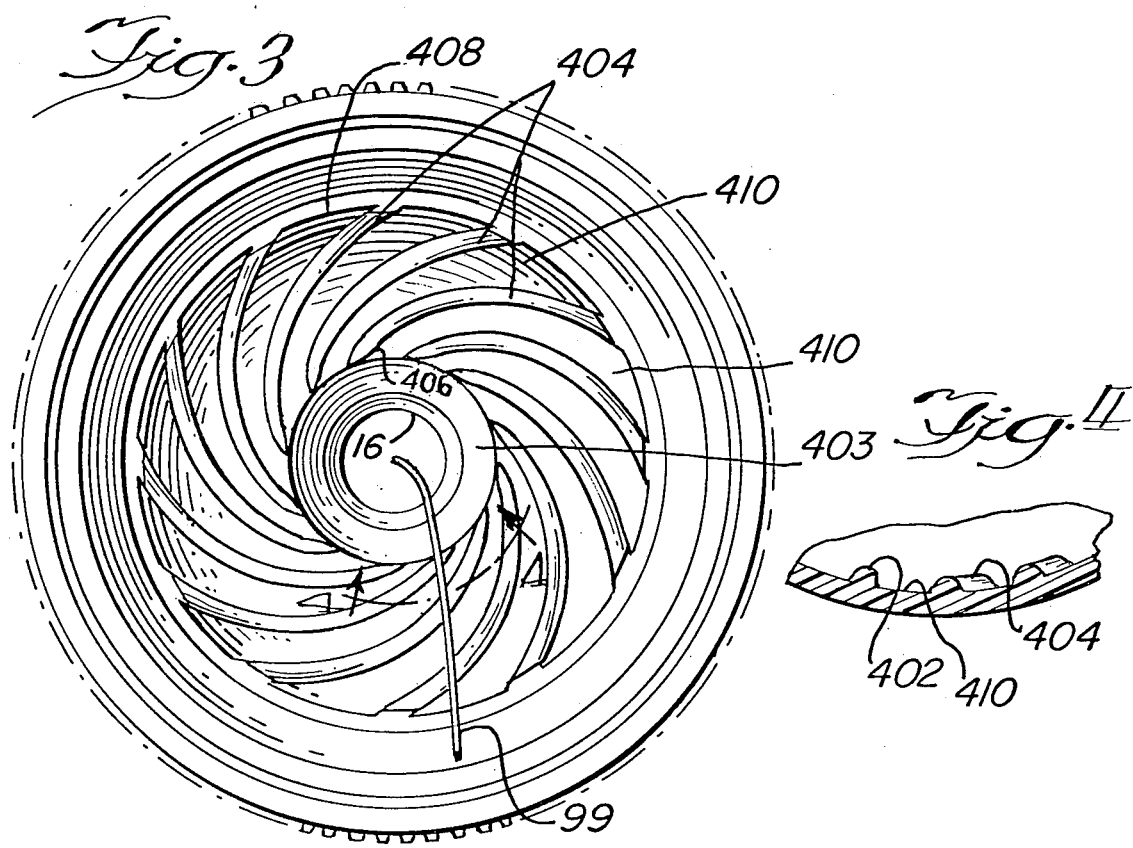

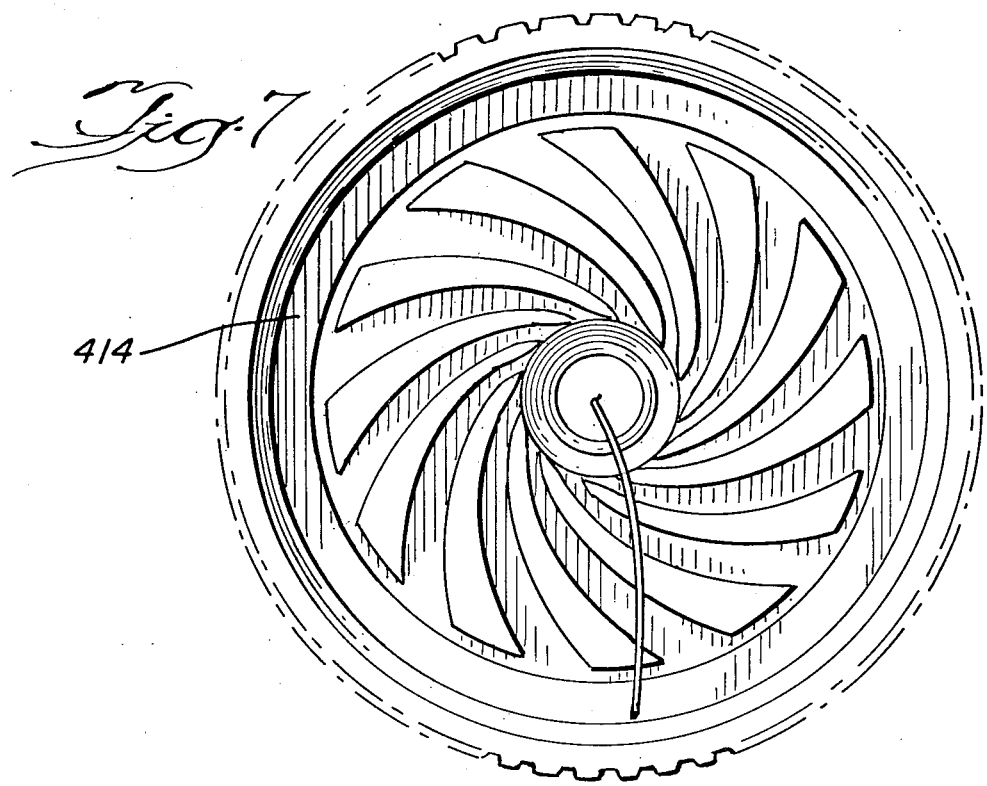
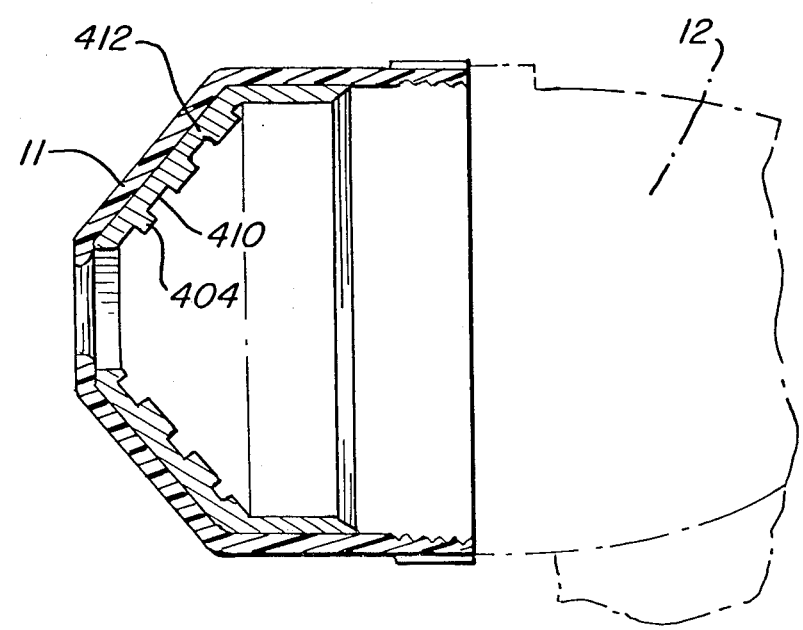

SPIN CASTING TYPE REEL WITH DRAG REDUCING FRONT COVER

TECHNICAL FIELD

This invention relates to spin casting style fishing reels and, more particularly to a cover for reducing drag on a fishing line when the fishing line is cast.

BACKGROUND ART

Prior types of spinning style fishing reels include a front cover having a conical inner surface surrounding a circular line guide through which the fishing line extends. The conical inner surface is smooth and the fishing line contacts and runs over the smooth inner surface when the fishing line is cast.

Once the fishing line has been cast, water and other debris may adhere to the fishing line and be deposited on the smooth inner conical surface during subsequent casts. The water and debris produces drag when the fishing line is again cast and contacts these materials due to the surface tension of the water and the frictional effect of the debris. In effect the fishing line tends to adhere or become "glued" to the smooth inner conical surface during the casting operation. The net result is that greater effort is required to cast the fishing line the same amount of distance as when the inner conical surface was dry.

The present invention is directed to overcoming the problem as set forth above.

DISCLOSURE OF INVENTION

This invention relates to spin casting style fishing reels and comprehends apparatus for reducing drag on the fishing line, which drag may be due to the presence of water or debris on the inner surface of a front cover of the reel.

A spin casting style reel includes a front cover having an inner conical contact surface which includes ribbed and grooved portions. The fishing line is substantially only in contact with the ribbed portions when the line is cast, thereby reducing the amount of water or debris-laden surfaces in contact with the fishing line. Furthermore, the debris and water which may be present within the front cover tend to collect in the grooved portions away from the fishing line, in turn further reducing the drag on the line.

The inner conical surface may be made of low friction materials such as Teflon which would further reduce drag on the fishing line as it is cast.

The structure for reducing drag on the fishing line may be simply and inexpensively manufactured integrally with the front cover by one of several means, such as molding, stamping or the like. Alternatively, the drag reducing structure may be manufactured as a separate insert to be used with any front cover that has smooth inner conical surfaces. The drag reducing structure of the present invention has no moving parts, and hence is trouble-free since it requires little or no maintenance.

BRIEF DESCRIPTION OF THE DRAWINGS

FIG. 2 is an elevational view, partly in section, of the fishing reel shown in FIG. 1;

FIG. 3 is a sectional view taken along the line 3—3 of FIG. 2;

FIG. 4 is a partial sectional view taken along line 4—4 of FIG. 3;

FIG. 7 is an elevational view of an alternative embodiment of the outside of the front cover shown in FIG. 3; and FIG. 8 is a partial sectional view of a further embodiment of the invention.

DESCRIPTION OF THE BASIC STRUCTURE AND OPERATION OF THE FISHING REEL

Figure 1:
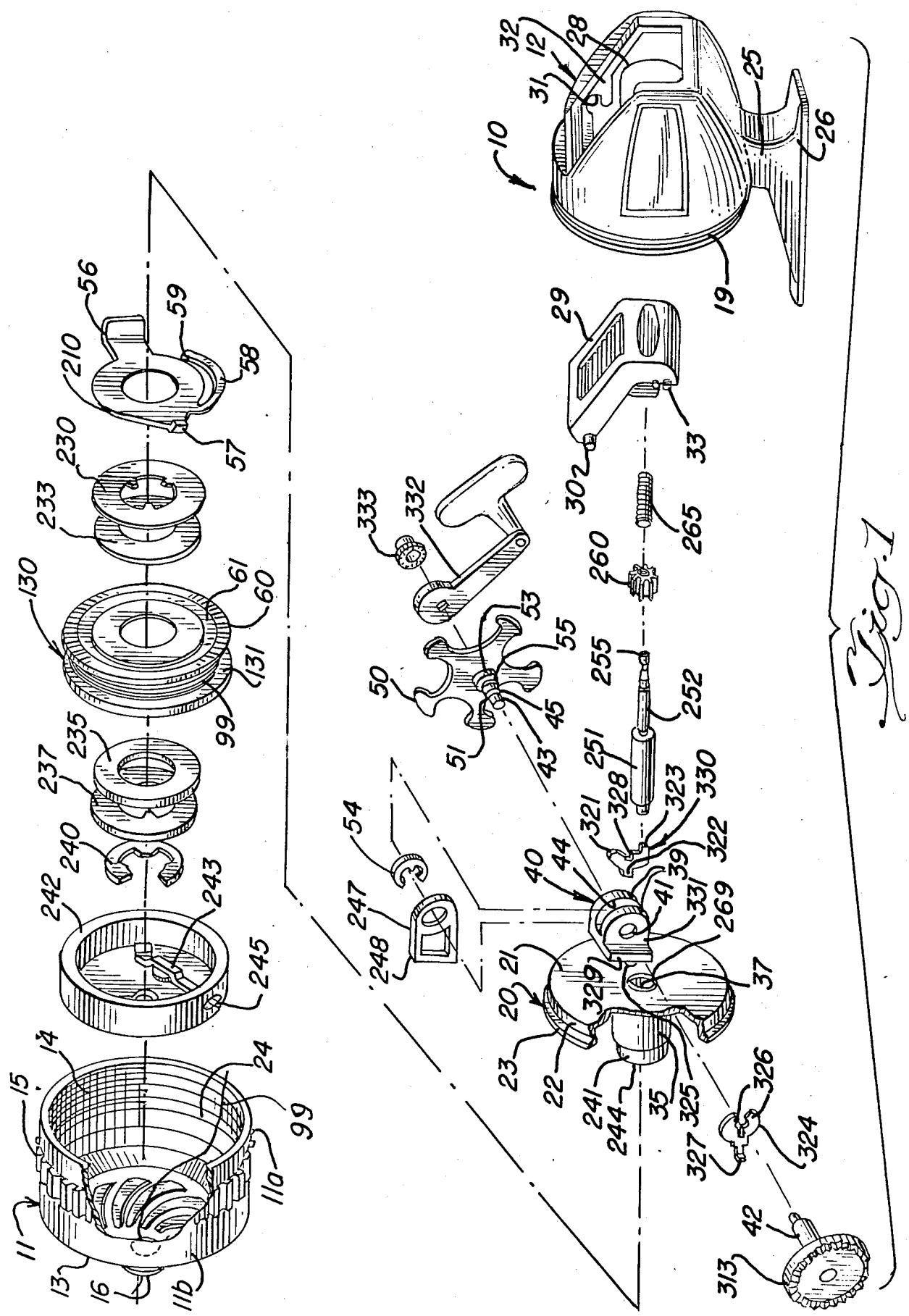
FIG. 1 is an exploded perspective view of a spinning style fishing reel incorporating the drag reducing means of the present invention.

Referring now to FIG. 1, there is shown a reel, including a closed face housing 10, having a two-part front cup-shaped cover 11 and a rear cup-shaped cover 12. The front cover 11 has a ring or cylindrically-shaped first part 11a and a cone-shaped second part 11b. The ring or cylindrically-shaped first part 11a of the front cover 11 is molded from a high impact strength plastic, such as ABS. The rear cover 12 is formed of a platable grade ABS with a chrome or nickel plating. The cone-shaped second part 11b has means for rigidly locking the second part 11b to the first part 11a. The cone-shaped second part 11b of the cover 11 has a conical front portion 13 including a circular line opening which mounts an annular line guide 16 in a known manner. The cylindrical first part 11a of the front cover 11 has helical threads 14 formed on the rearmost internal surface thereof and has knurled gripping portions 15 formed on the external surface thereof. The front cover 11 could be made in one piece of either metal or plastic without departing from the invention.

A reel body 20 includes a circular mounting plate or deck plate 21 which has a forwardly extending cylindrical sleeve 22 integrally formed around the outer periphery thereof. The reel body 20 may be made of plastic material, such as ABS or a glass filled polycarbonate. The forward edge of the sleeve 22 has a flange 23 extending radially outward beyond the outer surface of the sleeve 22. The cylindrical first part 11a of the front cover 11 is undercut rearward of the internal thread 14 to provide a rearwardly facing shoulder 24 axially spaced from the end of the internal thread 14. The reel body 20 with the radially extending flange 23 is inserted in the rear opening of the front cover 11 with the flange 23 bearing against the shoulder 24 in the undercut portion. The rear cover 12 has on its forwardly facing end portion an external thread 19 which is threaded into the internal thread 14 of the front cover 11 until the forwardly facing edge of the rear cover 12 engages the radially outwardly extending flange 23 to trap the reel body 20 between the front cover 11 and the rear cover 12.

The rear cover 12 has an integrally molded, radially extending stem 25 with a mounting foot 26 on the outer end thereof for attachment to an appropriate part of a fishing rod. The mounting foot 26 is to be attached to the upper surface of a fishing rod for use.

The rear cover 12 has a rearwardly facing opening 28 that is substantially rectangular in shape extending through a sloped upper portion and vertical rear portion thereof. A one-piece thumb button 29 has a shape substantially mating with the shape of the opening 28 in the rear cover 12 and has a pair of sidewardly extending pivots 30 on the upper forward side edges thereof which snap into a slotted pivot opening 31 formed in the adjacent side walls 32 of the opening 28. A pair of sidewardly extending tabs 33 are formed on the lower side edges of the thumb button 29 such that with the thumb button 29 assembled from the inside of the rear cover 12, the sidewardly extending pivots 30 will snap into the slot at openings 31 in the walls 32 of the rear cover 12, with the sidewardly extending tabs 33 abutting a vertical inner surface of the rear cover 12 adjacent the opening 28. The tabs 33 prevent the thumb button 29 from pivoting rearwardly out of the opening 28 in the rear cover 12.

A central hub 35 is carried by and projects forward of the deck plate 21 concentric with the sleeve 22 with a drag plate 210, a back spool washer 230, a back flat drag washer 233, a spool assembly 130, a front flat drag washer 235 and a front spool washer 237, all retained on the hub 35 by means of a spool retainer clip 240 which fits into a groove (not shown in FIG. 1) aligned with a shoulder separating the hub 35 from a reduced diameter front portion 241 of hub 35.

A center shaft 251 is mounted in a sleeve bearing 269 seated in a center hole 37 extending through the deck plate 21 and hub 35, with a spinner head assembly 242 threaded onto the forward threaded end of the shaft 251. The spinner head assembly 242 partially surrounds the forward flange of the spool assembly 130 with a supply of fishing line 99 being wound on a spool 131 of the spool assembly 130. The line 99 is wound or unwound from the spool 131 over the spinner head assembly 242 and through the line guide 16 in the front cover 11.

The center shaft 251 is slidably and rotatably mounted in the sleeve bearing 269 of the deck plate 221. A pinion gear 260 is splined on a reduced diameter splined portion 252 of the center shaft 251 and is resiliently maintained in a forward position against the deck plate 21 by a center shaft spring 265. The spring 265 bears against an abutting end 255 on the center shaft 251 to urge the pinion gear 260 against the deck plate 21 and to urge the center shaft 251 in a rearward direction relative to the deck plate 21. The splined connection between the pinion gear 260 and the center shaft 251 permits the axial sliding motion of the shaft 251 relative to the pinion gear 260 while at the same time rotation of the pinion gear 260 will rotate the center shaft 251.

Depressing the thumb button 29 moves the center shaft 251 and spinner head assembly 242 forward relative to the hub 35. As the spinner head assembly 242 moves forward, a pickup pin mechanism 243, mounted on the spinner head assembly 242, will move forward of and will disengage from the front portion 241 of the hub 35 and from a cam 244 on the axial face of the front portion 241 of the hub 35, thereby retracting a pickup pin 245 from its extended position radially outward of the spinner head assembly 242. With the thumb button 29 fully depressed, a line brake member (not shown in FIG. 1) on the forward face of the spinner head assembly 242 will be urged against the inside of the cone-shaped part 11b of the front cover 11 to trap the line 99 therebetween to prevent casting of the line from the reel. Slightly releasing the pressure on the thumb button 29 will maintain the spinner head assembly 242 in a forward casting position, but the spring 265 will retract the center shaft 251 and the spinner head assembly 242 enough to unclamp the line 99 whereby the spinner head assembly 242 will not interfere with the fishing line 99 which can then be cast from the reel.

The deck plate 21 also includes a rearwardly projecting boss 40 having spaced apart legs 39 with aligned transverse openings 41 therethrough for receiving, in a concentric manner, a crankshaft 42 surrounded, in part, by a cylindrical post 43. The boss 40 has a slot 44 between the legs 39, which slot 44 extends transverse to the axis of the opening 41. The slot 44 aligns with a slot (not shown in FIG. 1) in the deck plate 21 with a slide drag actuator 247 positioned in the slots and being threadably engaged with a threaded portion 45 of the post 43. The drag actuator 247 extends through the aligned slots and forward of the deck plate 21 and is moved by rotation of the post 43 in a direction along the axis of the post 43 between the spaced apart legs 39 of the boss 40. The degree of drag braking pressure applied to the spool 131 through the drag actuator 247 is selectively and precisely controllable through a star wheel 50 mounted on the post 43 where the post 43 projects outward of the boss 40. The post 43 has spaced bearing surfaces 51 and 53 which seat in the openings 41. A retainer clip 54 engages in a slot 55 at the junction between the bearing surface 53 and the threads 45 on the post 43, which slot 55 aligns with one wall of the slot 44 so that the star wheel 50 and the post 43 can be rotated relative to the boss 40 without the post 43 moving axially relative to the boss 40.

A projecting contact head 248 of the drag actuator 247 engages with an arcuately curved extended cam 56 on the drag plate 210. The drag plate 210 has an anchoring tab 57 located diametrically opposite the cam 56, which tab 57 engages in a recess (not shown in FIG. 1) in the front surface of the deck plate 21. A cantilever arm 58 has a peripheral connection with the drag plate 210 and extends along an arc parallel to a peripheral portion of the drag plate 210. The cantilever arm 58 has an axially facing tip 59 engaging with serrations 60 on the axially facing surface of one flange 61 of the spool 131. The drag plate 210 bears against the back spool washer 230, the back flat drag washer 233, the spool assembly 130, the front flat drag washer 235 and the front spool washer 237, all of which are backed against the fixed retainer clip 240. The contact head 248 of the drag actuator 247 engages with the cam 56 and, as it is moved radially outward of the drag actuator 247, the pressure or drag on the spool 131 will be increased and, as the drag actuator 247 is moved radially inward on the cam 56, the pressure or drag on the spool 131 will be decreased. The drag actuator 247 is advanced or moved radially inward (decreased drag) by rotating the star wheel 50 in one direction and is retracted or moved radially outward (increased drag) by rotating the star wheel 50 in the opposite direction.

The crankshaft 42, with a gear 313 attached at one end, is inserted through the post 43 in the boss 40 and has a handle 332 attached by means of a nut 333 to the other end of the crankshaft 42. The gear 313 meshes with the pinion gear 260 on the center shaft 251 so that rotation of the crank handle 332 will rotate the center shaft 251 and the spinner head assembly 242.

An anti-reverse assembly 330, which is associated with the crankshaft 42, includes a ratchet (not shown in FIG. 1), fixed on the back of the gear 313 for rotation with the gear 313 and the crankshaft 42. The anti-reverse assembly 330 further includes a pivotable pawl 321 having a pivot tab 322, a pawl tooth 323 and a pawl actuator 324. The pawl pivot tab 322 extends into a slot 325 formed in deck plate 21, the slot 325 having one wall in alignment with the one wall 329 which is offset radially inward toward the center shaft 251 from the end face 331 of the boss 40. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the midportion of the pawl 321. The pawl 321 with the pivot tab 322 in the slot 325 will have one face of the pawl 321 against the wall 329 of the boss 40 and will have the pawl tooth 323 aligned with the ratchet. The crankshaft 42, when telescoped in the post 43 and the boss 40, will locate the pawl actuator 324 between the ratchet 336, fixed on the back face of gear 313, and the end face 331 of the boss 40 in the vicinity of the opening 41 in the boss 40, so that the pawl actuator 324 is offset slightly from the pawl 321 with the transverse actuator tab 327 engaged in the recess 328 of the pawl 321. Rotation of the crank handle 332 in a counterclockwise direction as viewed in FIG. 1, will pivot the crankshaft 42 and the pawl actuator 324 in a counterclockwise direction which will pivot the pawl 321 in a clockwise direction around pawl pivot tab 322 to move the pawl tooth 323 out of alignment with the teeth of the ratchet. The crank handle 332 will, therefore, be permitted to be rotated in the direction without interference. The gripping resistance between the pawl actuator 324 and the crankshaft 42 will be overcome as soon as the pawl 321 pivots to its extreme position, whereupon the crankshaft 42 continues to rotate relative to the pawl actuator 324.

Rotation of the handle 332 in the clockwise direction moves the pawl actuator 324 in the clockwise direction with the tab 327 pivoting the pawl 321 in a counterclockwise direction to move the pawl tooth 323 into the path of the ratchet teeth to stop further rotation of the crankshaft 42 and handle 332 in that direction.

DESCRIPTION OF THE PREFERRED EMBODIMENTS

Referring now to FIGS. 2-5, there is illustrated in greater detail the cone-shaped second part 11*b* of the front cover 11 according to the present invention.

The cone-shaped second part 11*b* of the front cover 11 includes an inner bearing or contact surface 402 located axially between the spool 131 and central or collar surface 403 adjacent to the line guide 16 on the interior of the cone-shaped second part 11*b*.

The inner bearing or contact surface of the cone-shaped part consists of equally-spaced ribs 404 which, in the preferred embodiment illustrated, have a spiral shape which begin at an inner peripheral boundary 406 surrounding the collar surface 403 and spiral outward to the right (FIG. 3) and which terminate at an outer peripheral boundary 408 which is concentric with the inner peripheral boundary 406.

Disposed between each pair of adjacent ribs 404 is a recessed channel or groove 410, which is recessed with respect to the collar surface 403 and the ribs 404.

The recessed channels or grooves 410 and the ribs 404 may be formed integrally with the front cover 11. In the preferred embodiment, the front cover 11, the ribs 404 and the recessed channels or grooves 410 are integrally fabricated from high impact plastic, such as ABS, and formed by an injection molding process. Alternatively, the front cover 11 and the ribs 404 and recessed channels 410 may be made of metal, such as aluminum, and integrally formed by a stamping process. A still further alternative is to fabricate the entire assembly of a material having a low coefficient of friction, such as material sold under the name Teflon, a registered trademark of E. I. DuPont DeNemours, Inc.

In the event the front cover 11*b*, the raised portions or ribs 404 and the recessed channels or grooves 410 are fabricated of metal using a stamping process, an outside front surface 414 may assume the fan-like configuration being a reverse image of that shown in FIG. 3, i.e. where a rib 404 is shown in FIG. 3, a recessed portion would appear on the outside front surface 414 shown in FIG. 7.

Referring also to FIG. 8, it is also possible to form the ribs 404 and the channels 410 as part of a sleeve 412, made of plastic or metal, which fits and is retained within the standard front cover 11 having a smooth inner conical surface as has heretofore been known in the art. The sleeve 412 may be retained within the front cover 11 by means of adhesive or other suitable bonding agent.

In one operative embodiment, the inner peripheral boundary 406 has a diameter of 0.764 inch while the diameter of the outer peripheral boundary 408 is 1.680 inch. Twelve equally spaced ribs 404 surround the collar surface 403, with the ribs being nominally 0.040 inch wide and the center line of each rib 404 having a nominal radius equal to 0.625 inch.

Each of the recessed channels or grooves 410 has a depth of approximately 0.030 inch. The recessed channels 410 increase in width from the inner boundary 406 to the outer boundary 408 and therefore have a fan-like appearance as shown specifically in FIG. 3.

Figure 5:
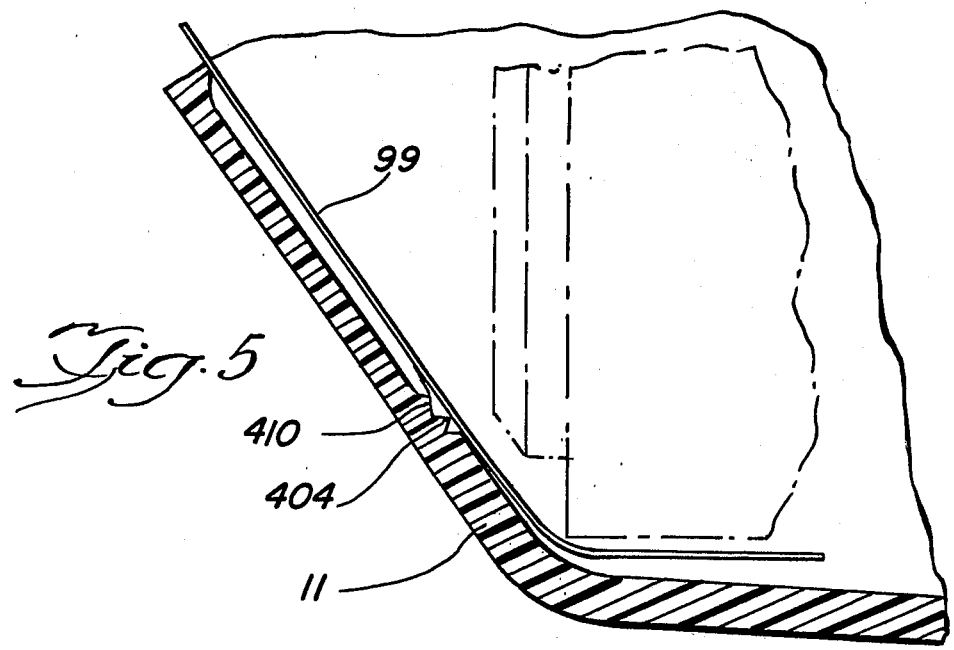
FIG. 5 is an enlarged fragmentary view of a portion of FIG. 3 showing the engagement of the fishing line with the ribs of the inner conical surface of the front cover.

As the fishing line 99 is played out during casting, the fishing line 99 assumes a flattened spiral shape and rotates about the line guide 16 due to its uncoiling off of the spool 131. As seen in FIGS. 2, 3 and 5, the fishing line 99 contacts substantially only the ribs 404 transverse to the grooves 410 and water and other debris which may be carried by the line 99 may be scraped off by the movement of the line over the ribs 404. Continued casting and retraction of the fishing line 99 leads to an accumulation of water and/or debris on the inner contact surface 402. This accumulation of water and debris, however, tends to collect in the recessed channels or grooves 410 away from the ribs 404 and hence away from the fishing line 99.

As seen in FIG. 2, contact of the fishing line 99 with the collar surface 403 is avoided since the surface 403 has a diameter at its juncture with the apex of the cone-shaped part 11*b* which is greater than the diameter of the line guide. Hence, the line 99 is carried over and out of contact with the collar surface 403, thereby insuring that the line 99 contacts substantially only the ribs 404. Since the ribs form only a small portion of the inner contact surface 402, frictional contact, and hence drag, is reduced. Moreover, since water and debris tend to collect in the recessed channels or grooves 410 away from the crests of the ribs 404, contact of the fishing line 99 with water and other debris is minimized. This, in turn, greatly reduces drag on the fishing line 99 caused by the surface tension of the water and frictional engagement with debris contained within the front cover 11, thereby leading to even greater casting efficiency.

It should be noted that other configurations for the ribs 404 and channels 410 may be utilized, so long as the contact of the line is only with the ribs thereby reducing drag on the line. A wet line will not adhere or grab a crest of a rib or ribs as it is exiting the spool and traversing the inside of the front cover so that the cast will not be shortened or aborted.

Figure 6:
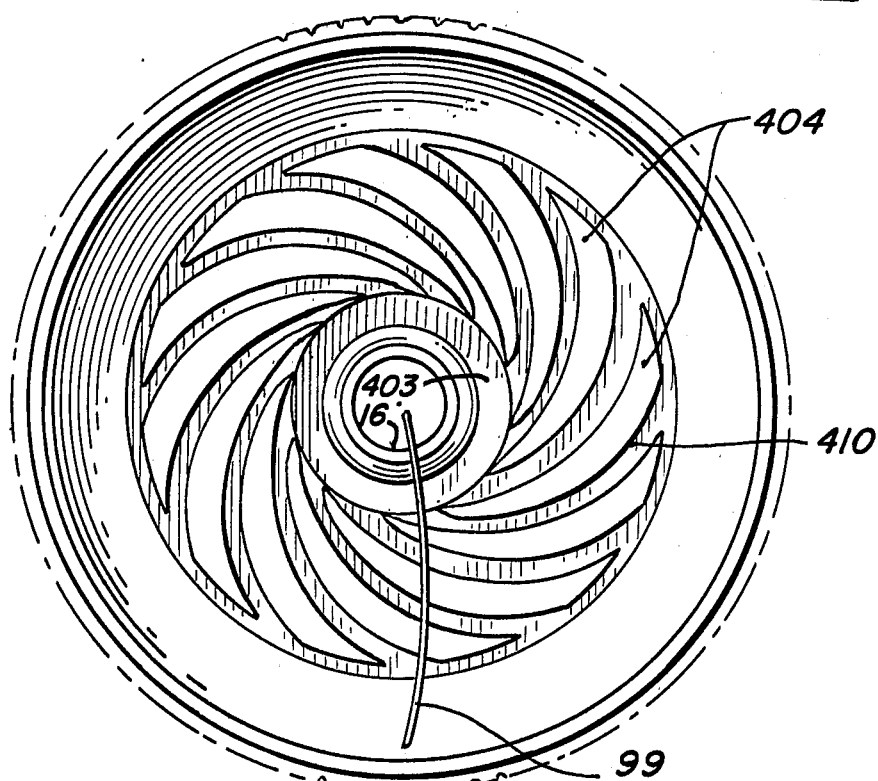
FIG. 6 is a view similar to FIG. 3 showing an alternative embodiment of the invention.

Referring now to FIG. 6, there is illustrated an alternative embodiment of the invention, wherein the ribs 404 are raised from the level of the central or collar surface 403. In this embodiment, the recessed channels or grooves 410 are recessed only with respect to the crests of the ribs 404 but not with respect to the collar surface 403. Moreover, the grooves are spiral in shape while the ribs assume a fan-like appearance. In all other respects, this embodiment is identical to that shown in FIGS. 2–5.

The functioning of the embodiment of FIG. 6 is substantially identical to that described above with respect to the first embodiment, with the fishing line contacting substantially only the ribs 404 to reduce or eliminate surface drag on the line. Incidentally, water and other debris tends to be collected in the recessed channels 410, away from the outgoing fishing line 99. The result is that casting efficiency is improved, even after many casts have been performed.

Other aspects, objects and advantages of this invention can be obtained from a study of the drawings, the disclosure and the appended claims.

I claim:

1. In a spin casting type fishing reel having a reel structure comprising: front cover means having a line guide therein, rear cover means, central mounting plate means, the plate means being an individual component, the plate means having a forwardly facing front wall and a rearwardly facing back wall, a spool for storing fishing line mounted on the front wall, line pickup means mounted on the front wall between the spool and front cover, means mounted in cooperation with the pickup means and the plate means to permit line to be cast off the spool and then rewound thereon, the line when cast or rewound passing through the line guide; the improvement characterized in that the front cover has
a front portion that is conical in shape with the line guide located substantially at the apex of the cone, the front conical portion have an outer surface and an inner surface,
spiral-shaped ribs formed on the inner surface and facing rearwardly of the front cover,
line from the spool passing over the inner surface of the conical portion and contacting the facing surfaces of the spiral-shaped ribs reducing contact of the line with the front cover thereby increasing the casting efficiency.

2. In a spin casting type fishing reel having a fishing line wound on a spool, means for allowing the fishing line to be unwound from the spool to permit casting thereof and a front cover for enclosing the spool, the front cover having an inner contact surface subject to becoming wet and which is contacted by the fishing line as it is cast and means for guiding the fishing line as it is wound or unwound, the improvement comprising:
a plurality of means disposed on the inner contact surface forming a series of spiral ribs and channels, the fishing line contacting substantially only the ribs of the inner contact surface as the fishing line is cast to reduce drag on the fishing line caused by contact thereof with the inner contact surface.

3. The improvement of claim 2, wherein the front cover includes a collar surface disposed between the inner contact surface and the fishing line guiding means, the channels being recessed with respect to the collar surface.

4. The improvement of claim 3, wherein the fishing line extends transverse to the ribs.

5. The improvement of claim 3, wherein the collar surface is of a first diameter at the point where it meets the fishing line guiding means and wherein the guiding means has a diameter less than the first diameter such that the fishing line substantially avoids contact with the collar surface.

6. The improvement of claim 2, wherein the front cover includes a collar surface disposed between the inner contact surface and the fishing line guiding means, the ribs being raised with respect to the collar surface.

7. The improvement of claim 6, wherein the channels are spiral in shape and wherein the fishing line extends transverse to the channels.

8. The improvement of claim 2, wherein the ribs extend in a spiral fashion between an inner peripheral boundary and an outer peripheral boundary.

9. In a spin casting type fishing reel having a fishing line wound on a spool, means for allowing the fishing line to be unwound from the spool to permit casting thereof, a front cover for enclosing the spool, the front cover having an inner cone-shaped contact surface subject to an accumulation of water and debris and which is contacted by the fishing line as it is cast and means for guiding the fishing line as it is wound or unwound, the improvement comprising:
a plurality of equally-spaced upraised ribs of spiral shape extending between inner and outer peripheral boundaries and surrounding the fishing line guiding means, the ribs extending transversely with respect to the fishing line and being of a height such that the fishing line contacts substantially only the crests of the ribs of the inner contact surface as the fishing line is cast to reduce drag on the fishing line caused by contact thereof with the inner contact surface.

10. In a spin casting type fishing reel, a reel structure comprising: a front cover having a line guide therein, a rear cover, a central mounting plate, the mounting plate can be an individual component or in combination with one of the covers; the mounting plate having a forwardly facing front wall and a rearwardly facing backwall, a spool for storing fishing line mounted on the front wall; means mounted on the plate to permit line to be cast off the spool and to be rewound on to the spool, the line when cast or retrieved passing through the line guide; the front cover has a front portion that is conical in shape with the line guide located substantially at the apex of the cone, the front conical portion having an outer surface and an inner surface, the improvement characterized by:
protuberance means on the inner conical surface facing towards the pickup means located adjacent the line guide, the protuberance means having the facing surface formed in a spiral that intersects the line at substantially right angles so that the line has limited point contact with the protuberance means during casting of the line.

11. In a spin casting type fishing reel having a reel structure comprising: front cover means having a line guide therein, rear cover means, central mounting plate means, the plate means being an individual component, the plate means having a forwardly facing front wall and a rearwardly facing back wall, a spool for storing fishing line mounted on the front wall, line pickup means mounted on the front wall between the spool and front cover, means mounted in cooperation with the pickup means and the plate means to permit line to be cast off the spool and then rewound thereon, the line when cast or rewound passing through the line guide;

the improvement characterized in that the front cover has a front portion that is conical in shape with the line guide located substantially at the apex of the cone, spiral-shaped ribs formed on the front conical portion and projecting forwardly and rearwardly of the front conical portion, line from the spool passing over the inner surface of the conical portion and contacting the rearwardly facing surfaces of the ribs reducing contact of the line with the front cover thereby increasing the casting efficiency.

12. In a spin casting reel as claimed in claim 11 wherein the ribs extend from the line guide outwardly toward the periphery of the conical portion.

13. In a spin casting type fishing reel having a reel structure comprising: front cover means having a line guide therein, rear cover means, central mounting plate means having a forwardly facing front wall for receiving a spool of fishing line, means for permitting line to be cast off the spool and then rewound thereon, the line when cast or rewound passing through the line guide;

the front cover has a front portion that is conical in shape with the line guide located substantially at the apex of the cone, the improvement characterized by:

the front conical portion have an outer surface and an inner surface, spiral-shaped ribs formed on the inner surface and facing rearwardly of the front cover, whereby line from the spool passing over the inner surface of the conical portion and contacting the facing surfaces of the spiral-shaped ribs reducing contact of the line with the front cover thereby increasing the casting efficiency.

14. In a spin casting reel as claimed in claim 13 wherein the spiral-shaped ribs extend through the front cover and form forwardly facing ribs on the outer surface of the front cover.

* * * * *